United States Patent
Jaiswal et al.

(10) Patent No.: US 10,938,985 B2
(45) Date of Patent: Mar. 2, 2021

(54) CONTEXTUAL PREFERRED RESPONSE TIME ALERT

(71) Applicant: International Business Machines Corporation, Armonk, NY (US)

(72) Inventors: Priyansh Jaiswal, Boca Raton, FL (US); Shikhar Kwatra, Durham, NC (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/200,762

(22) Filed: Nov. 27, 2018

(65) Prior Publication Data

US 2020/0169634 A1    May 28, 2020

(51) Int. Cl.
| | | |
|---|---|---|
| *H04M 3/42* | (2006.01) | |
| *G06Q 30/00* | (2012.01) | |
| *G06Q 10/10* | (2012.01) | |

(52) U.S. Cl.
CPC .... *H04M 3/42195* (2013.01); *G06Q 10/1097* (2013.01); *G06Q 30/016* (2013.01); *H04M 3/42136* (2013.01)

(58) Field of Classification Search
CPC ........................ H04M 3/42195; G06Q 10/1095
USPC .................................................... 379/210.01
See application file for complete search history.

(56) References Cited

U.S. PATENT DOCUMENTS

| | | | |
|---|---|---|---|
| 5,155,761 A | 10/1992 | Hammond | |
| 5,185,782 A | 2/1993 | Srinivasan | |
| 5,742,674 A | 4/1998 | Jain et al. | |
| 5,905,793 A | 5/1999 | Flockhart et al. | |
| 7,224,774 B1 | 5/2007 | Brown et al. | |
| 7,720,091 B2 | 5/2010 | Faber et al. | |
| 7,912,193 B2 | 3/2011 | Chingon et al. | |
| 8,027,447 B2 | 9/2011 | Sylvain | |
| 8,189,759 B2 | 5/2012 | Couse et al. | |
| 9,565,300 B2 | 2/2017 | Chan et al. | |
| 9,635,180 B2 | 4/2017 | Chen et al. | |
| 10,027,803 B2 * | 7/2018 | Krinsky | H04M 3/5231 |
| 2008/0255977 A1 * | 10/2008 | Altberg | G06Q 30/02 705/35 |
| 2011/0302169 A1 | 12/2011 | Brdiczka et al. | |
| 2015/0381803 A1 * | 12/2015 | Klemm | H04M 3/4285 455/412.1 |
| 2018/0007208 A1 | 1/2018 | Ohayon et al. | |
| 2019/0114804 A1 * | 4/2019 | Sundaresan | G06T 7/74 |

OTHER PUBLICATIONS

IBM, "Method for Optimal Return of Calls", Mar. 1, 1994, IP.COM, IP.COM No. IPCOM000111550D, <https://ip.com/IPCOM/000111550>, 3 pages.

\* cited by examiner

*Primary Examiner* — Ahmad F. Matar
*Assistant Examiner* — Jirapon Intavong
(74) *Attorney, Agent, or Firm* — Joseph P. Curcuru; Edward J. Wixted, III

(57) ABSTRACT

In an approach for recommending a response time for callback, a processor receives an indication to initiate a callback to a caller after the caller requests the callback from a callee, wherein the callee is a user whom the caller has called. A processor analyzes callback information. A processor determines a callback time based on the callback information. A processor sends an alert about the callback, wherein the alert includes the determined callback time.

18 Claims, 3 Drawing Sheets

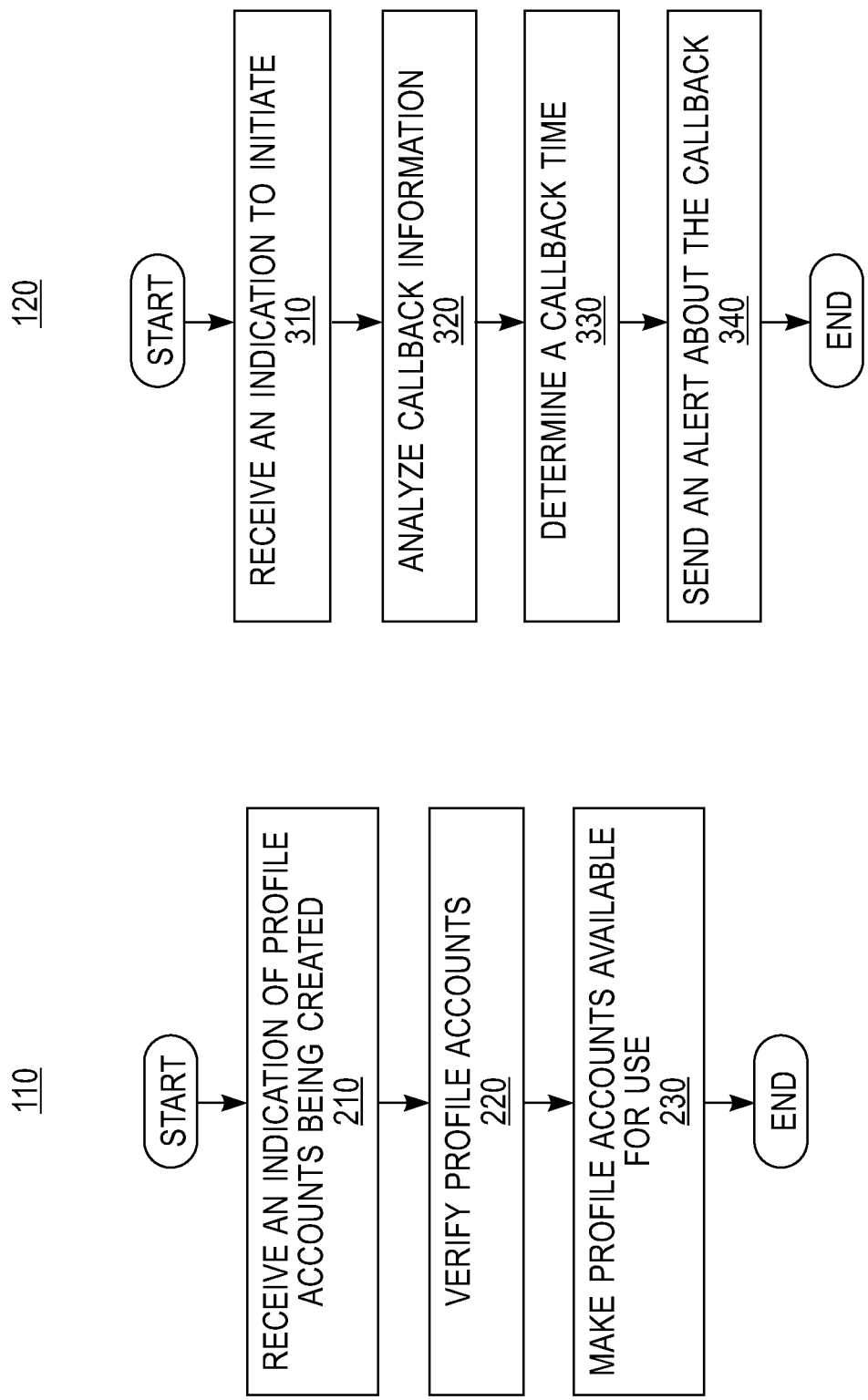

CONTEXTUAL PREFERRED RESPONSE TIME ALERT

BACKGROUND

The present invention relates generally to the field of customer service, and more particularly to recommending a response time for callback.

Customer service is the provision of service to customers before, during, and after a purchase. The perception of success of such interactions is dependent on employees who can adjust themselves to the personality of the customer. Customer service concerns the priority an organization assigns to customer service relative to components, such as, product innovation and pricing. As such, an organization that values good customer service may spend more money in training employees than the average organization or may proactively interview customers for feedback. Good customer service is also measured on an efficient interaction between the customer and the customer service employees.

SUMMARY

Aspects of an embodiment of the present invention disclose a method, computer program product, and computing system for recommending a response time for callback. A processor receives an indication to initiate a callback to a caller after the caller requests the callback from a callee, wherein the callee is a user whom the caller has called. A processor analyzes callback information. A processor determines a callback time based on the callback information. A processor sends an alert about the callback, wherein the alert includes the determined callback time.

BRIEF DESCRIPTION OF THE DRAWINGS

FIG. 2 depicts a flowchart of the steps of a profile program, executing within the computing system of FIG. 1, for setting up profiles.

FIG. 3 depicts a flowchart of the steps of a callback program, executing within the computing system of FIG. 1, for recommending a response time for callback.

DETAILED DESCRIPTION

Embodiments of the present invention recognize that customer service is the bridge between an organization and its current and potential customers. If the organization wants to improve the quality of its customer service, the efforts must begin with doing things to make the customer more comfortable. Embodiments of the present invention recognize that many customers despise staying on hold for long periods of time, because the customer's time is valuable to them. For example, a customer calls a particular call center, and there is a wait time of 45 minutes, causing the customer to hang up. After 45 minutes, the call center calls back to the customer, but at that time, the customer is engaged in a different contextual activity or just busy at that time. This leads to unnecessary delay and frustration on the customer's end.

For a second example, user A calls user B, but user B is busy at that particular time. Then after some time, when user B gets free, user B gives user A a callback. However, at this time, user A is now occupied and the back and forth can become frustrating when this similar situation goes on in a loop. Embodiments of the present invention understands the contextual situation and preferred time of the original caller and then alerts the original call receiver or automatically dials the call when the original caller is available.

Embodiments of the present invention disclose a feature that contextually analyzes and dynamically identifies the preferred time to initiate a callback without manual inputs. Embodiments of the present invention provides a feature that computes the best available time to call back a caller who was placed on hold, based on contextual analysis of the caller's schedule.

Embodiments of the present invention will now be described in detail with reference to the Figures.

Figure 1:
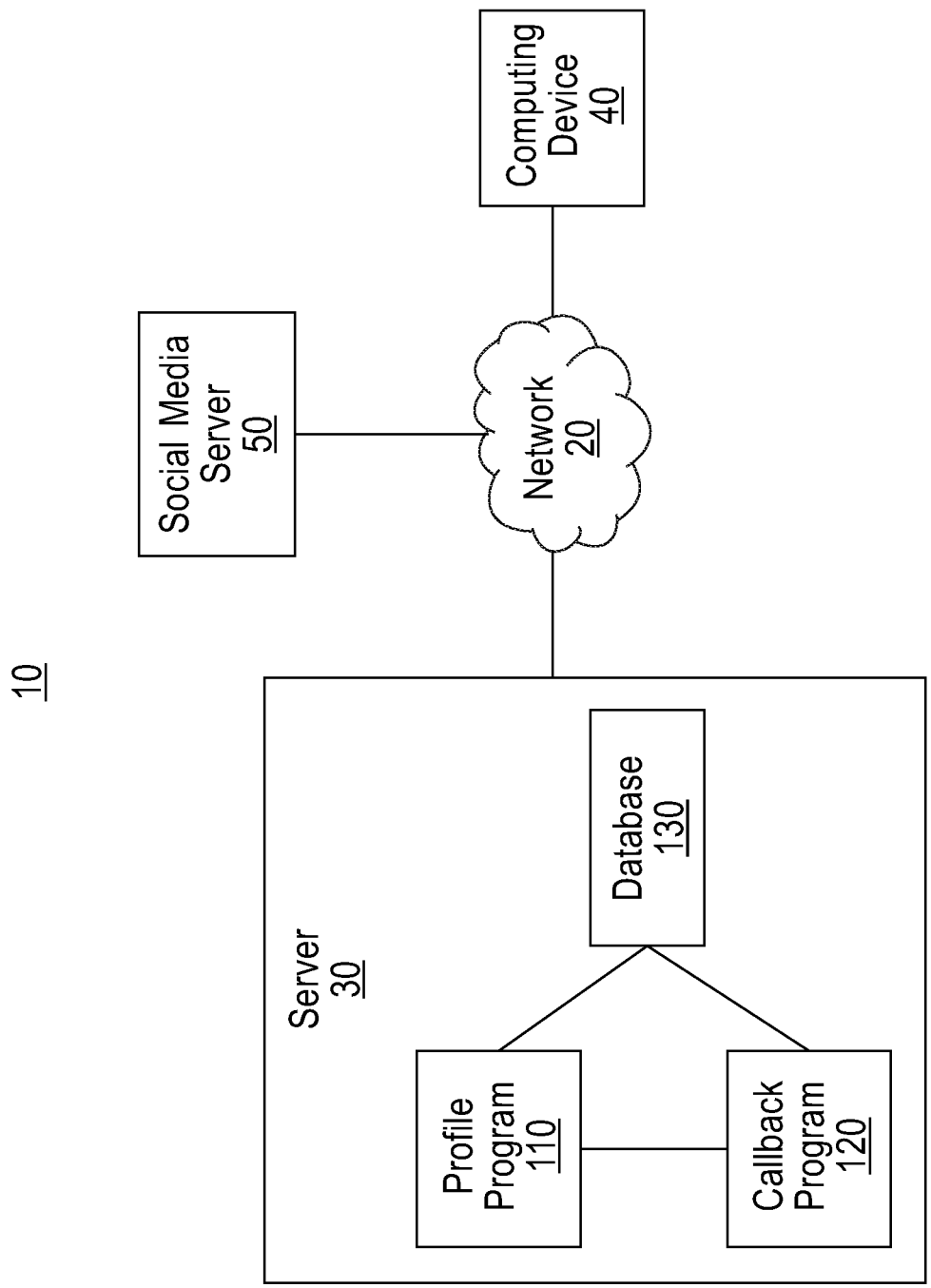
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30, computing device 40, and social media server 50 interconnected over network 20. Network 20 may be a local area network (LAN), a wide area network (WAN) such as the Internet, a cellular data network, any combination thereof, or any combination of connections and protocols that will support communications between server 30, computing device 40, and social media server 50, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 and social media server 50 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In one embodiment, server 30 contains information, such as, for example, previous conversations between customer service agents and callers. In other embodiments, server 30 hosts a call center/help desk website. In some embodiments, server 30 is a call center platform. In other embodiments, server 30 may include multiple components, as depicted and described in further detail with respect to FIG. 4.

Computing device 40 may be a personal device, mobile phone, desktop computer, laptop computer, netbook computer, tablet computer, management server, web server, or application server. In general, computing device 40 may be any electronic device or computing system capable of processing program instructions, sending and receiving data, and communicating with other devices over a network. In the some embodiments, computing device 40 may include components, as depicted and described in further detail with respect to FIG. 4.

Social media server 50 may be a management server, a web server, or any other electronic device or computing system capable of processing program instructions and receiving and sending data. In some embodiments, social media server 50 may be a laptop computer, tablet computer, netbook computer, personal computer (PC), a desktop computer, or any programmable electronic device capable of communicating with server 30 and computing device 40 via network 20. In other embodiments, social media sever 50 may represent a server computing system utilizing multiple computers as a server system, such as in a cloud computing environment. In another embodiment, social media sever 50 represents a computing system utilizing clustered computers and components to act as a single pool of seamless resources. In one embodiment, social media server 50 contains information, such as, for example, expressions of interest from various social media websites. In other embodiments, social media server 50 hosts a social networking website. In some embodiments, social media server 50 is a social media platform. In other embodiments, social media server 50 may include multiple components, as depicted and described in further detail with respect to FIG. 4.

Profile program 110 sets up profiles. The profiles are profile accounts for users and companies that allow companies to determine the best time to give the user a callback. In doing so, profile program 110 receives an indication of profile accounts being created. Profile program 110 verifies profile accounts. Profile program 110 makes profile accounts available for use. In the depicted embodiment, profile program 110 resides on server 30. In other embodiments, profile program 110 may reside on another server or another computing device, provided that profile program 110 can access sever 30, computing device 40, social media server 50, callback program 120, and database 130.

Callback program 120 recommends a response time for callback. In doing so, callback program 120 receives an indication to initiate. Callback program 120 analyzes callback information. Callback program 120 determines a callback time. Callback program 120 sends an alert about the callback. In the depicted embodiment, callback program 120 resides on server 30. In other embodiments, callback program 120 may reside on another server or another computing device, provided that callback program 120 can access sever 30, computing device 40, social media server 50, profile program 110, and database 130.

Database 130 may be a repository that may be written to and/or read by profile program 110 and callback program 120. In one embodiment, profile program 110 may receive caller information and store the received caller information to database 130. In some embodiments, callback program 120 may retrieve customer service interaction information and store the retrieved customer service interaction information to database 130. In other embodiments, database 130 may store information about the interaction with a customer service agent and a caller. In the depicted embodiment, database 130 resides on server 30. In other embodiments, database 130 may reside on another server or another computing device, provided that database 130 is accessible to profile program 110 and callback program 120.

FIG. 2 depicts a flowchart of the steps of a profile program, executing within the computing system of FIG. 1, in accordance with an embodiment of the present invention. Profile program 110 sets up profiles.

In step 210, profile program 110 receives an indication of profile accounts being created. In one embodiment, profile program 110 receives an indication that a caller sets up a profile account, where the caller allows access to the caller's calendar information; geo-spatial and temporal metrics (location and time); conversations between the caller and customer service agents; caller identifying information; contextual information; and/or social networking media information (deployed with predetermined security rules). In some embodiments, profile program 110 stores the information within the caller's profile account to database 130, having a unique identifier for each caller. The unique identifier allows the information within each caller's profile to be easily accessed. In other embodiments, profile program 110 receives an indication that a callee (e.g., a company or call center) sets up an account to view the information details or credentials of the caller. In some embodiments, profile program 110 stores the information within the callee's profile account to database 130, having a unique identifier for each callee, or company.

In one embodiment, the profile account information is located on server 30, and profile program 110 is able to retrieve the profile account information from server 30. In some embodiments, the profile account information is located on social media server 50, and profile program 110 is able to retrieve the profile account information from social media server 50. In other embodiments, profile account information is located on database 130, and profile program 110 is able to retrieve profile account information from database 130. In some embodiments, profile program 110 uses natural language processing to receive the input information in a necessary form for use.

In one embodiment, profile program 110 preprocesses and aggregates the retrieved profile account information. For example, a caller's input (e.g., profile account information) can be collected as text and audio files from different platforms. Profile program 110 can format and merge the data.

In step 220, profile program 110 verifies profile accounts. In some embodiments, for security purposes, each callee creating an account must be verified as legitimate before the callee can access the caller's profile account information. In one embodiment, profile program 110 verifies a callee's profile account by contacting someone close to the callee (i.e., if a company, someone at the company). In other embodiments, profile program 110 verifies a callee's profile account through encryption. In some embodiments, profile program 110 verifies a callee's profile account through a password/passcode. Still, in other embodiments, profile program 110 may verify profile accounts using any known methods for account verification.

In step 230, profile program 110 makes profile accounts available for use. In one embodiment, profile program 110 makes caller profile accounts available for use, automatically, after creation. In other embodiments, profile program 110 makes caller profile accounts available for use subsequent to the verification of a callee's profile account. In one embodiment, profile program 110 may make profile accounts available for use by using any known methods for making an account available for use (e.g., deployment and encryption removal). In some embodiments, profile program 110 makes profile accounts available for use, using the unique identifier. In other embodiments, profile program 110 makes profile accounts available for use by, for example, accessing the unique identifier of caller A to map to caller A's profile account and populating caller A's profile account information onto a display (e.g., a computer screen).

FIG. 3 depicts a flowchart of the steps of a callback program, executing within the computing system of FIG. 1, in accordance with an embodiment of the present invention. Callback program 120 recommends a response time for callback.

In step 310, callback program 120 receives an indication to initiate. In one embodiment, a caller dials a callee, or dials into a customer service center or other service, where the caller is placed on hold. The caller can be given a specific wait time and prompted if the caller wants to stay on hold or wants the callee, or customer service agent, to give the caller a call back when the waitlist is over. If the caller chooses to be called back, then, in one embodiment, callback program 120 receives an indication to initiate. In some embodiments, callback program 120 receives an indication to initiate when the caller hangs up from the place that they have called (after choosing the option to be called back). In other embodiments, callback program 120 receives an indication to initiate after receiving a request from the callee, or company, for which the caller has called but was placed on hold. In some embodiments, callback program 120 attaches a timestamp to the initiation.

In step 320, callback program 120 analyzes callback information. In one embodiment, callback program 120 studies the caller using a recurrent convolutional neural network (R-CNN) output for activity detection. In deep learning, a convolutional neural network (CNN) is a class of deep, feed-forward artificial neural networks, most commonly applied to analyzing visual imagery. CNNs use relatively little pre-processing compared to other image classification algorithms, meaning that the network learns the filters that in traditional algorithms were hand-engineered. The independence from prior knowledge and human effort in feature design is a major advantage. CNNs have applications in image and video recognition, recommender systems and natural language processing.

In one embodiment, callback program 120 cross references the caller's schedule with the callee's schedule in order to identify the best time to call back the caller. During the analysis, callback program 120 considers the caller's free time and location from, for example, the caller's calendar, social networking media sites (e.g., social media server 50), as well as other possible methods to determine the caller's free time and location. In some embodiments, callback program 120 uses a principal component analysis for caller cognitive state detection at an instant time, wherein the caller's mood (e.g., confused, calm, relaxed, etc.) and/or the situation (e.g., at work, party, home, etc.) the caller may be in at the different available callback times. For example, callback program 120 may determine from the caller's calendar and social networking media sites that the caller will be in a happy mood at the first available time, because the caller will be at a party. Next, callback program 120 analyzes the context of the return call to determine if it would be better to call at a later available time. In some embodiments, callback program 120 uses topic detection and metadata formation, namely, annotations and tags for various types of conversations. For example, the caller should not be called back about a rejected loan when they are having a good time with family at a party. In some embodiments, callback program 120 gathers the topic of conversation from the small initial conversation (whether it was with a callee, human customer service agent, or a customer service chatbot) before the caller was placed on hold and given the option for a callback at a future time.

In one embodiment, callback program 120 uses mel-frequency cepstral coefficients (MFCCs) for audio extraction and semantic information processing associated with the topic activity. In some embodiments, callback program 120 uses audio extraction and semantic information processing associated with the topic activity to assist in determining the topic of the potential conversation during the callback and/or the topic of what is surrounding the caller at the potential time for callback (e.g., being at home, a party, in traffic, etc.).

In sound processing, the mel-frequency cepstrum (MFC) is a representation of the short-term power spectrum of a sound, based on a linear cosine transform of a log power spectrum on a nonlinear mel scale of frequency. MFCCs are coefficients that collectively make up an MFC. MFCCs are derived from a type of cepstral representation of the audio clip. The difference between the cepstrum and the MFC is that in the MFC, the frequency bands are equally spaced on the mel scale, which approximates the human auditory system's response more closely than the linearly-spaced frequency bands used in the normal cepstrum. This frequency warping can allow for better representation of sound, for example, in audio compression.

In step 330, callback program 120 determines a callback time. In one embodiment, callback program 120 determines a callback time, based on the analysis of the callback information. In some embodiments, callback program 120 determines a callback time, based on matching the analyzed and determined caller's available times with the available times from the callee to compute the best next available time to call back the caller.

In one embodiment, callback program 120 determines a callback time by using various factors. For example, callback program 120 first considers general factors, wherein the general factors include times where the average person would be busy (e.g., dinner time, business hours, and sleeping hours). General factors are previously stored to database 130. After callback program 120 clears the general factors, callback program 120 considers factors specific to the caller. The factors specific to the caller include the information determined from the analysis of the callback information from step 320. At this point, callback program 120 determines the best available callback time based on the analysis of the callback information to give a time outside of the times within the general factors.

In step 340, callback program 120 sends an alert about the callback. In one embodiment, callback program 120 sends an alert about the callback to the caller in the form of a message (e.g., text message and email). For example, the alert about the callback could be information explaining to the caller that the caller will be receiving a call at the determined best available time. In some embodiments, callback program 120 sends an alert about the callback to a callee (e.g., a customer service agent at a company) where the caller made the original call. For example, the alert about the callback could be information explaining to the callee that the callee will need to give the caller a callback at the determined best available time. The alert could be sent in close proximity to the actual callback time or at a predetermined time before the actual callback time. In other embodiments, callback program 120 sends an alert about the callback, wherein the alert is a call. In other words, callback program 120 causes a phone, computer system, or any other device to reach the caller to automatically callback the caller at the determined best available time. For example, when a customer service agent's queue is free at the determined best available callback time, callback program 120 causes the customer service agent's phone to automatically call back the caller at the determined best available callback time. In such an embodiment, a separate device (e.g., a telephone) is tied to the present invention.

Figure 4:
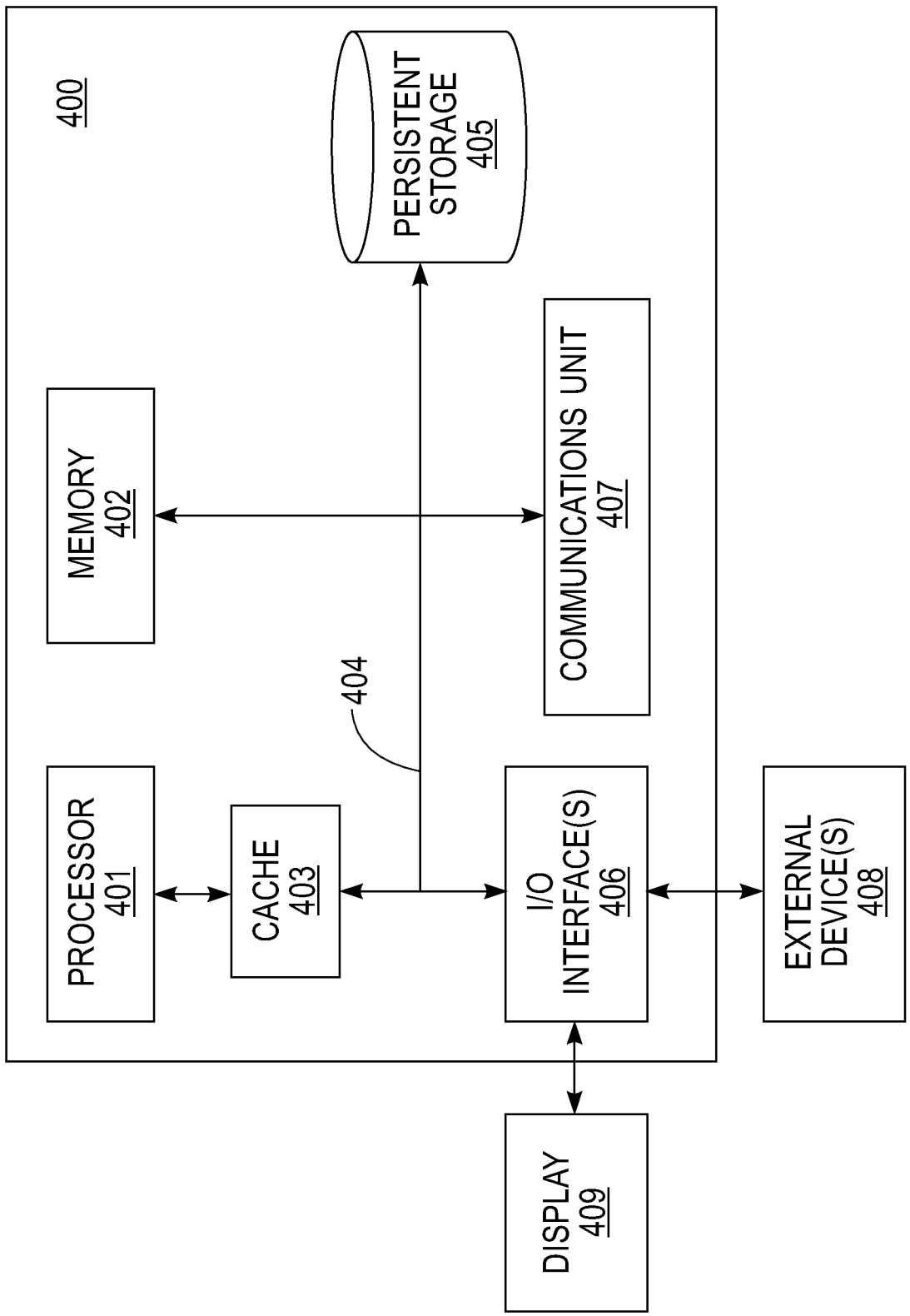
FIG. 4 depicts a block diagram of components of the server and/or the computing devices of FIG. 1, in accordance with an embodiment of the present invention.

FIG. 4 depicts computer system 400, which is an example of a system that includes components of server 30 and/or computing device 40. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407. Profile program 110, callback program 120, and database 130 may be downloaded to persistent storage 405 of server 30 through communications unit 407 of server 30.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., profile program 110, callback program 120, and database 130, can be stored on such portable computer readable storage media and can be loaded onto persistent storage 405 of server 30 via I/O interface(s) 406 of server 30. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, an indication to initiate a callback to a caller after the caller requests the callback from a callee, wherein the callee is a user whom the caller has called;
   analyzing, by one or more processors, callback information, wherein analyzing the callback information includes using a recurrent convolutional neural network, cross referencing a caller's schedule with a callee's schedule, a principal component analysis for caller cognitive state detection at an instant time, topic detection and metadata formation, and mel-frequency cepstral coefficients for audio extraction and semantic information processing associated with topic activity;
   determining, by one or more processors, a callback time based on the callback information; and
   sending, by one or more processors, an alert about the callback, wherein the alert includes the determined callback time.

2. The method of claim 1, further comprising:
   receiving, by one or more processors, an indication of the creation of one or more profile accounts, allowing access to profile account information, wherein the one or more profile accounts include caller profiles and callee profiles;
   verifying, by one or more processors, the one or more profile accounts;
   storing, by one or more processors, the verified one or more profile accounts to a database, wherein each verified profile account of the verified one or more profile accounts is tagged with a unique identifier; and
   making, by one or more processors, the verified profile account available for use by using the unique identifier associated with the verified profile account to map to the verified profile account and populate the profile account information associated with the verified profile account onto a display.

3. The method of claim 2, wherein the profile account information includes calendar information, geo-spatial and temporal metrics, conversations between a caller and a customer service agent, caller identifying information, contextual information, and social networking media information, wherein the social networking media information is deployed with predetermined security rules.

4. The method of claim 1, wherein receiving an indication to initiate a callback to a caller after the caller requests the callback comprises:
   receiving, by one or more processors, the indication to initiate the callback to the caller after receiving a request from the callee for which the caller has called and was placed on hold.

5. The method of claim 1, wherein sending an alert about the callback comprises:
causing, by one or more processors, a device to automatically callback a caller at the determined callback time based on the callback information, wherein the device includes a phone and a computer system.

6. The method of claim 1, wherein the callback information includes information from studying the caller using a recurrent convolutional neural network output for activity detection and information about the caller's free time and location.

7. A computer program product comprising:
one or more computer readable storage media and program instructions stored on the one or more computer readable storage media, the program instructions comprising:
program instructions to receive an indication to initiate a callback to a caller after the caller requests the callback from a callee, wherein the callee is a user whom the caller has called;
program instructions to analyze callback information, wherein analyzing the callback information includes using a recurrent convolutional neural network, cross referencing a callers schedule with a callee's schedule, a principal component analysis for caller cognitive state detection at an instant time, topic detection and metadata formation, and mel-frequency cepstral coefficients for audio extraction and semantic information processing associated with topic activity;
program instructions to determine a callback time based on the callback information; and
program instructions to send an alert about the callback, wherein the alert includes the determined callback time.

8. The computer program product of claim 7, further comprising:
program instructions to receive an indication of the creation of one or more profile accounts, allowing access to profile account information, wherein the one or more profile accounts include caller profiles and callee profiles;
program instructions to verify the one or more profile accounts;
program instructions to store the verified one or more profile accounts to a database, wherein each verified profile account of the verified one or more profile accounts is tagged with a unique identifier; and
program instructions to make the verified profile account available for use by using the unique identifier associated with the verified profile account to map to the verified profile account and populate the profile account information associated with the verified profile account onto a display.

9. The computer program product of claim 8, wherein the profile account information includes calendar information, geo-spatial and temporal metrics, conversations between a caller and a customer service agent, caller identifying information, contextual information, and social networking media information, wherein the social networking media information is deployed with predetermined security rules.

10. The computer program product of claim 7, wherein program instructions to receive an indication to initiate a callback to a caller after the caller requests the callback comprise:
program instructions to receive the indication to initiate the callback to the caller after receiving a request from the callee for which the caller has called and was placed on hold.

11. The computer program product of claim 7, wherein program instructions to send an alert about the callback comprise:
program instructions to cause a device to automatically callback a caller at the determined callback time based on the callback information, wherein the device includes a phone and a computer system.

12. The computer program product of claim 7, wherein the callback information includes information from studying the caller using a recurrent convolutional neural network output for activity detection and information about the caller's free time and location.

13. A computer system comprising:
one or more computer processors, one or more computer readable storage media, and program instructions stored on the one or more computer readable storage media for execution by at least one of the one or more computer processors, the program instructions comprising:
program instructions to receive an indication to initiate a callback to a caller after the caller requests the callback from a callee, wherein the callee is a user whom the caller has called;
program instructions to analyze callback information, wherein analyzing the callback information includes using a recurrent convolutional neural network, cross referencing a caller's schedule with a callee's schedule, a principal component analysis for caller cognitive state detection at an instant time, topic detection and metadata formation, and mel-frequency cepstral coefficients for audio extraction and semantic information processing associated with topic activity;
program instructions to determine a callback time based on the callback information; and
program instructions to send an alert about the callback, wherein the alert includes the determined callback time.

14. The computer system of claim 13, further comprising:
program instructions to receive an indication of the creation of one or more profile accounts, allowing access to profile account information, wherein the one or more profile accounts include caller profiles and callee profiles;
program instructions to verify the one or more profile accounts;
program instructions to store the verified one or more profile accounts to a database, wherein each verified profile account of the verified one or more profile accounts is tagged with a unique identifier; and
program instructions to make the verified profile account available for use by using the unique identifier associated with the verified profile account to map to the verified profile account and populate the profile account information associated with the verified profile account onto a display.

15. The computer system of claim 14, wherein the profile account information includes calendar information, geo-spatial and temporal metrics, conversations between a caller and a customer service agent, caller identifying information, contextual information, and social networking media information, wherein the social networking media information is deployed with predetermined security rules.

16. The computer system of claim 13, wherein program instructions to receive an indication to initiate a callback to a caller after the caller requests the callback comprise:
    program instructions to receive the indication to initiate the callback to the caller after receiving a request from the callee for which the caller has called and was placed on hold.

17. The computer system of claim 13, wherein program instructions to send an alert about the callback comprise:
    program instructions to cause a device to automatically callback a caller at the determined callback time based on the callback information, wherein the device includes a phone and a computer system.

18. The computer system of claim 13, wherein the callback information includes information collected from studying the caller using a recurrent convolutional neural network output for activity detection and information about free time and location of the caller.

\* \* \* \* \*